US008648324B2

(12) United States Patent
Kim et al.

(10) Patent No.: US 8,648,324 B2
(45) Date of Patent: Feb. 11, 2014

(54) GLASSY CARBON NANOSTRUCTURES

(75) Inventors: Ho-Cheol Kim, San Jose, CA (US); Sang-Min Park, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 12/727,710

(22) Filed: Mar. 19, 2010

(65) Prior Publication Data

US 2011/0227059 A1  Sep. 22, 2011

(51) Int. Cl.
*H01L 29/02* (2006.01)

(52) U.S. Cl.
USPC ............................. 257/2; 257/3; 257/E29.245

(58) Field of Classification Search
USPC .............. 257/E51.04, 2, 3, 4, 5, 43, E29.245, 257/E31.061, E31.127, E21.169; 438/22, 438/692
See application file for complete search history.

(56) References Cited

U.S. PATENT DOCUMENTS

| | | | | |
|---|---|---|---|---|
| 4,235,695 | A * | 11/1980 | De Nora et al. | 204/268 |
| 5,203,974 | A * | 4/1993 | Kokado et al. | 204/489 |
| 5,503,963 | A * | 4/1996 | Bifano | 430/321 |
| 7,189,435 | B2 | 3/2007 | Tuominen et al. | |
| 7,345,296 | B2 * | 3/2008 | Tombler et al. | 257/9 |
| 7,473,481 | B2 * | 1/2009 | MacPhee | 429/431 |
| 7,521,090 | B1 | 4/2009 | Cheng et al. | |
| 7,521,094 | B1 | 4/2009 | Cheng et al. | |
| 7,560,141 | B1 | 7/2009 | Kim et al. | |
| 2002/0050451 | A1 * | 5/2002 | Ford et al. | 204/252 |
| 2004/0028875 | A1 * | 2/2004 | Van Rijn et al. | 428/98 |
| 2004/0108220 | A1 * | 6/2004 | Stephan et al. | 205/538 |
| 2006/0057051 | A1 | 3/2006 | Dai et al. | |
| 2006/0113283 | A1 * | 6/2006 | Yoneda et al. | 216/88 |
| 2006/0172189 | A1 | 8/2006 | Kolodner et al. | |
| 2006/0234505 | A1 * | 10/2006 | Asano et al. | 438/688 |
| 2008/0170982 | A1 * | 7/2008 | Zhang et al. | 423/447.3 |
| 2008/0254362 | A1 * | 10/2008 | Raffaelle et al. | 429/188 |
| 2008/0276987 | A1 | 11/2008 | Flood | |
| 2008/0299353 | A1 | 12/2008 | Stoykovich et al. | |
| 2008/0311347 | A1 | 12/2008 | Millward et al. | |
| 2008/0315459 | A1 | 12/2008 | Zhang et al. | |
| 2009/0001045 | A1 | 1/2009 | Chen et al. | |
| 2009/0041986 | A1 | 2/2009 | Zhang et al. | |
| 2009/0071537 | A1 | 3/2009 | Yavuzcetin et al. | |
| 2009/0130380 | A1 * | 5/2009 | Asakawa et al. | 428/116 |
| 2009/0140240 | A1 * | 6/2009 | Nakamura et al. | 257/40 |
| 2009/0170342 | A1 | 7/2009 | Kim et al. | |
| 2009/0181171 | A1 | 7/2009 | Cheng et al. | |
| 2010/0140591 | A1 * | 6/2010 | Nicholas et al. | 257/40 |

OTHER PUBLICATIONS

Jinwoo Lee et al., "Synthesis of new nanoporous carbon materials using nanostructured silica materials as templates", Journal of Materials Chemistry 2004, vol. 14, pp. 478-486.

(Continued)

*Primary Examiner* — Cuong Q Nguyen
*Assistant Examiner* — Yosef Gebreyesus
(74) *Attorney, Agent, or Firm* — Daniel E. Johnson

(57) ABSTRACT

Glassy carbon nanostructures are disclosed that can be used as electrode materials in batteries and electrochemical capacitors, or as photoelectrodes in photocatalysis and photoelectrochemistry devices. In some embodiments channels (e.g., substantially cylindrically-shaped pores) are formed in a glassy carbon substrate, whereas in other embodiments, ridges are formed that extend along and over a glassy carbon substrate. In either case, a semiconductor and/or metal oxide may be deposited over the glassy carbon to form a composite material.

13 Claims, 15 Drawing Sheets

(56) References Cited

OTHER PUBLICATIONS

John C. Hulteen et al., "A general template-based method for the preparation of nanomaterials", Journal of Materials Chemistry 1997, vol. 7, No. 7, pp. 1075-1087.
Prashant V. Kamat, "Meeting the Clean Energy Demand: Nanostructure Architectures for Solar Energy Conversion", American Chemical Society 2007, J. Phys. Chem. C, vol. 111, No. 7, pp. 2834-2860.
Michael D. McGehee et al., "Nanostructured Photovoltaic Cells", Stanford University: Global Climate & Energy Project 2007 Technical Report, pp. 1-12.
Allen J. Bard et al., "Artificial Photosynthesis: Solar Splitting of Water to Hydrogen and Oxygen", American Chemical Society 1995, Acc. Chem. Res., vol. 28, No. 3, pp. 141-145.
Marianna Kemell et al., "Atomic Layer Deposition of Nanostructured TiO Photocatalysts via Template Approach", American Chemical Society 2007, Chem. Mater., vol. 19, No. 7, pp. 1816-1820.
Karran Woan et al., "Photocatalytic Carbon-Nanotube—TiO2 Composites", Advanced Materials 2009, vol. 21, pp. 1-7.
Hyunjung Shin et al.,"Formation of TiO2 and ZrO2 Nanotubes Using Atomic Layer Deposition with Ultraprecise Control of the Wall Thickness", Advanced Materials 2004, vol. 16, No. 14, pp. 1197-1200.
Melissa S. Sander et al., Template-Assisted Fabrication of Dense, Aligned Arrays of Titania Nonotubes with Well-Controlled Dimensions on Substrates, Advanced Materials 2004, vol. 16, No. 22, pp. 2052-2057.
Jinwoo Lee et al., "Recent Progress in the Synthesis of Porous Carbon Materials", Advanced Materials 2006, vol. 18, pp. 2073-2094.
Saifur Rahman et al., "Nanopillar Arrays of Glassy Carbon by Anodic Aluminum Oxide Nanoporous Templates", American Chemical Society 2003, Nano Letters, vol. 3, No. 4, pp. 439-442.
Anusorn Kongkanand et al., "Single Wall Carbon Nanotube Scaffolds for Photoelectrochemical Solar Cells. Capture and Transport of Photogenerated Electrons", American Chemical Society 2007, Nano Letters, vol. 7, No. 3, pp. 676-680.
Olivier J.A. Schueller et al., "Fabrication of glassy carbon microstructures by soft lithography", Elsevier Science S.A, Sensors and Actuators A72 1999, pp. 125-139.
Prashant V. Kamat, "Photochemistry on Nonreactive and Reactive (Semiconductor) Surfaces", American Chemical Society 1993, Chem. Rev., vol. 93, No. 1, pp. 267-300.
Michael D. McGehee, "Nanostructured Organic—Inorganic Hybrid Solar Cells" MRS Bulletin, Feb. 2009, vol. 34, pp. 95-100.
Frank E. Osterloh, "Inorganic Materials as Catalysts for Photochemical Splitting of Water", American Chemical Society 2008, Chem. Mater., vol. 20, No. 1, pp. 35-54.
Miri Park et al., "Large area dense nanoscale patterning of arbitrary surfaces", American Institute of Physics 2001, Applied Physics Letters, vol. 79, No. 2, pp. 257-259.

\* cited by examiner 87 deg　　　　　　　　18 deg

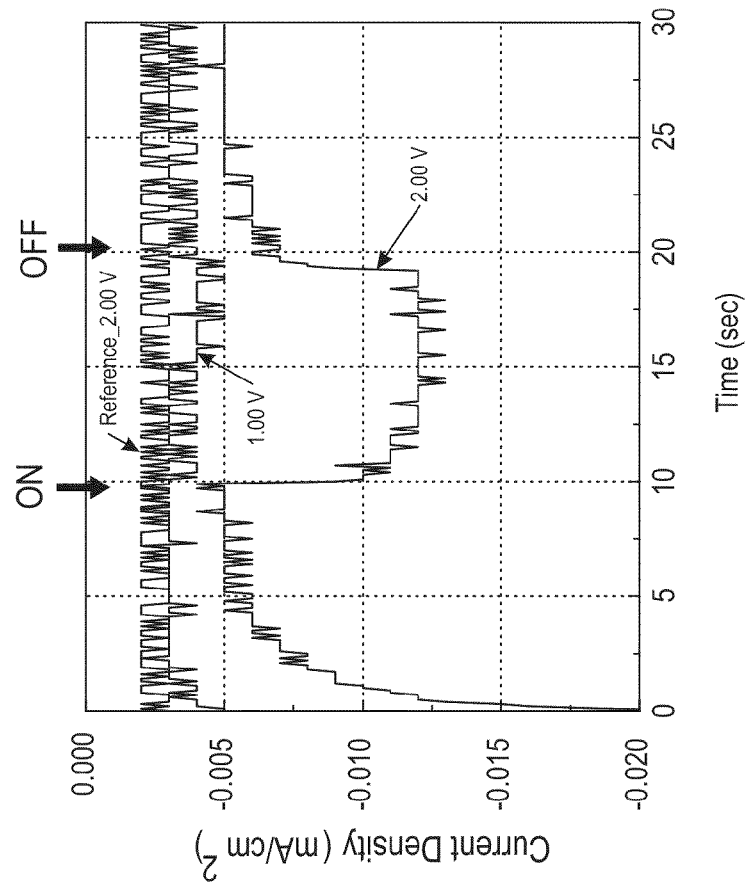
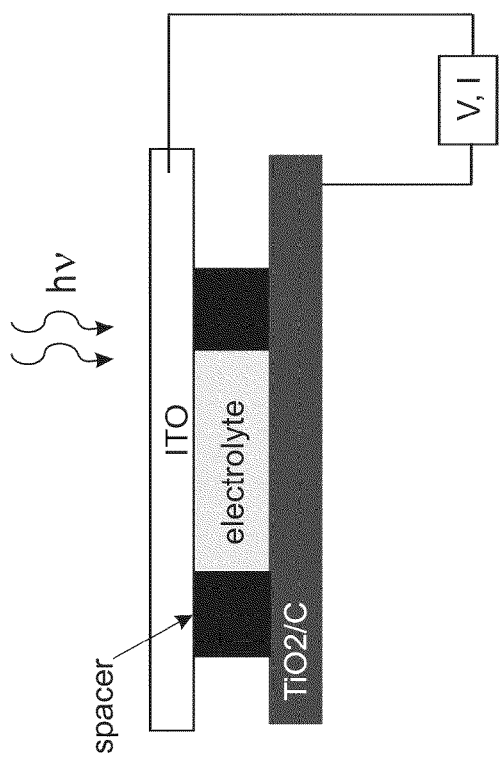
FIG. 16B
FIG. 16A
*Reference: without electrolyte

US 8,648,324 B2

GLASSY CARBON NANOSTRUCTURES

TECHNICAL FIELD

The invention relates to glassy carbon structures, and more particularly, to glassy carbon nanostructures suitable for use in batteries, electrochemical capacitors, and photocatalytic devices, for example.

BACKGROUND

There is increasing demand for clean and reliable sources of energy. It is widely believed that at least part of the solution lies in improved technologies for storing energy, such as batteries and electrochemical capacitors, in addition to technologies for generating energy, such as photovoltaic cells and photocatalytic devices. With respect to all of these technologies, there is a desire that any such devices be both compact and efficient.

Research into these fields has been intensive and is ongoing. For example, the photocatalytic activity of nanostructured semiconductor films has been widely explored in designing solar cells, solar hydrogen production, and environmental remediation (see, for example, P. V. Kamat, Chem. Rev. 93, 267 (1993); P. V. Kamat, J. Phys. Chem. C 111, 2834 (2007); and A. J. Bard et al., Acc. Chem. Res. 28, 141 (1995)). An ongoing challenge in attaining higher photoconversion efficiency is how to promote the transport of electrons to the collecting electrode surface without recombination events that would otherwise reduce device efficiency. To this end, various composite materials have been investigated (see, for example, A. Kongkanand, et al. Nano Lett. 7, 676 (2007)). Nevertheless, significant challenges remain, including the need to construct nanostructures having acceptable dimensions over a large area.

SUMMARY

Glassy carbon materials, semiconductor-glassy carbon composite materials, and metal oxide-glassy carbon composite materials are disclosed herein that can be used as an electrode in an electrochemical capacitor or in a battery (e.g., in a Li ion battery), or as a photoelectrode in photocatalysis or photoelectrochemistry devices. Associated methods are disclosed that lead to the formation of materials whose features can be controlled over a large area. In certain embodiments, channels (e.g., substantially cylindrically-shaped pores, which are preferably non-interconnected) are formed in a glassy carbon substrate, whereas in other embodiments, ridges are formed that extend along and over a glassy carbon substrate. With either the channel or the ridge embodiments, a semiconductor and/or metal oxide may be deposited over the glassy carbon to form a glassy carbon composite material.

The channels and ridges may be advantageously formed by applying a solution (that contains a block copolymer) over a glassy carbon substrate. Following self-assembly of the block copolymer, one of its domains is removed, thereby leaving a polymeric structure that is then used as an etch mask. An etch process, such as an oxygen plasma etch, can be used to remove portions of the glassy carbon substrate. Depending upon the block copolymer used and its morphology, channels or ridges may be formed in the underlying glassy carbon substrate. These channels and ridges have dimensions that facilitate the efficient splitting of electron-hole pairs when they are in contact with a semiconductor layer.

If a semiconductor layer and/or metal oxide layer is used, it may be applied through any one of a number of techniques, such as spin coating, dip coating, drop casting, vacuum deposition, electroplating, and so on. Moreover, the band gap of the semiconductor can be tuned by hybridizing one semiconductor material with one or more other materials. For example, titanium dioxide ($TiO_2$) may be hybridized with semiconductor nanocrystals (such as quantum dots) and metal oxides.

One preferred embodiment is a device that includes a first structure consisting essentially of glassy carbon, with the first structure having at least 1000 discrete channels extending into the first structure. The channels have i) a critical dimension (CD) between 5 and 70 nanometers; ii) an aspect ratio (depth/CD) of at least 1.0; and iii) an areal density of at least $10^{10}/cm^2$. The channels are preferably substantially cylindrical. In a preferred embodiment, a semiconductor (other than carbon) and/or metal oxide is in contact with the channels, e.g., the semiconductor and/or metal oxide may fill the channels or it may form a conformal layer over the first structure (e.g., this layer may have a thickness of at least 1 nanometer). If a semiconductor and/or metal oxide is used, it may be selected from the group consisting of titania, manganese oxide, tin oxide, and indium tin oxide. The first structure may be used in combination with another similar structure to form a battery, an electrochemical capacitor, or a photocatalytic device.

Another preferred embodiment is a device that includes a first structure consisting essentially of glassy carbon, with the first structure having at least 1000 discrete ridges therein. The ridges have i) a width between 5 and 70 nanometers; ii) a height to width ratio of at least 1.0; iii) a length to width ratio of at least 3.0; and iv) a linear density of at least $10^5/cm$, as measured along a line segment passing through the ridges. In a preferred embodiment, a semiconductor (other than carbon) and/or metal oxide is in contact with the ridges, e.g., the semiconductor and/or metal oxide may form a conformal layer over the first structure (e.g., this layer may have a thickness of at least 1 nanometer). If a semiconductor and/or metal oxide is used, it may be selected from the group consisting of titania, manganese oxide, tin oxide, and indium tin oxide. The first structure may be used in combination with another similar structure to form a battery, an electrochemical capacitor, or a photocatalytic device.

BRIEF DESCRIPTION OF THE DRAWINGS

FIG. 16 includes FIGS. 16A and 16B, in which:

FIG. 16A is a schematic of a cell that includes a titania-glassy carbon composite; and FIG. 16B shows how the current density of the cell changes upon exposure to UV light.

DETAILED DESCRIPTION

Preferred embodiments of the invention described herein include structures made of glassy carbon. Glassy carbon (also known as vitreous or polymeric carbon) may be produced by the thermal degradation of a phenolic resin or furfuryl alcohol, for example. Glassy carbon is a non-graphitizing carbon, a carbon that cannot be transformed into crystalline graphite even at temperatures above 3000° C. It has relatively low electrical resistivity [$\sim(3-8)\times 10^{-4}$ $\Omega$cm], as well as relatively low density (1.5 g/cm$^3$, compared to 2.26 g/cm$^3$ for graphite), with the latter being attributed to its significant volumetric pore fraction (~30% v/v). However, since these pores are "closed", they do not contribute to the accessible surface area.

Glassy Carbon Nanostructures

The structures disclosed herein may include either channels or ridges that are formed in a substrate consisting essentially of glassy carbon (e.g., the substrate could be 100% or nearly 100% pure, e.g., >99% pure). These features, which may have a characteristic dimension between 5 and 70 nm, effectively increase the surface area of the glassy carbon structure (in contrast with the "closed" pores described above, which do not increase the accessible surface area). This promotes better wettability with aqueous solutions and results in less pulverization of the structure as a result of any volume change that arises during ion insertion (e.g., Li ion insertion for Li-ion batteries).

Figure 1:
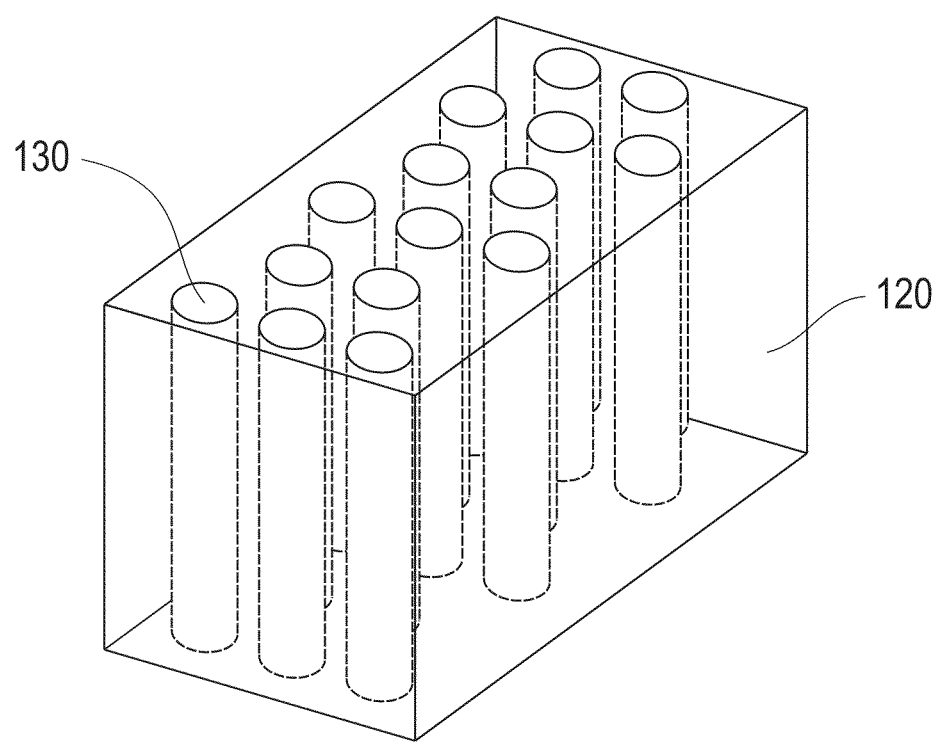
FIG. 1 is schematic of a glassy carbon structure, in which cylindrical channels extend beneath the surface of the structure.
Figure 2:
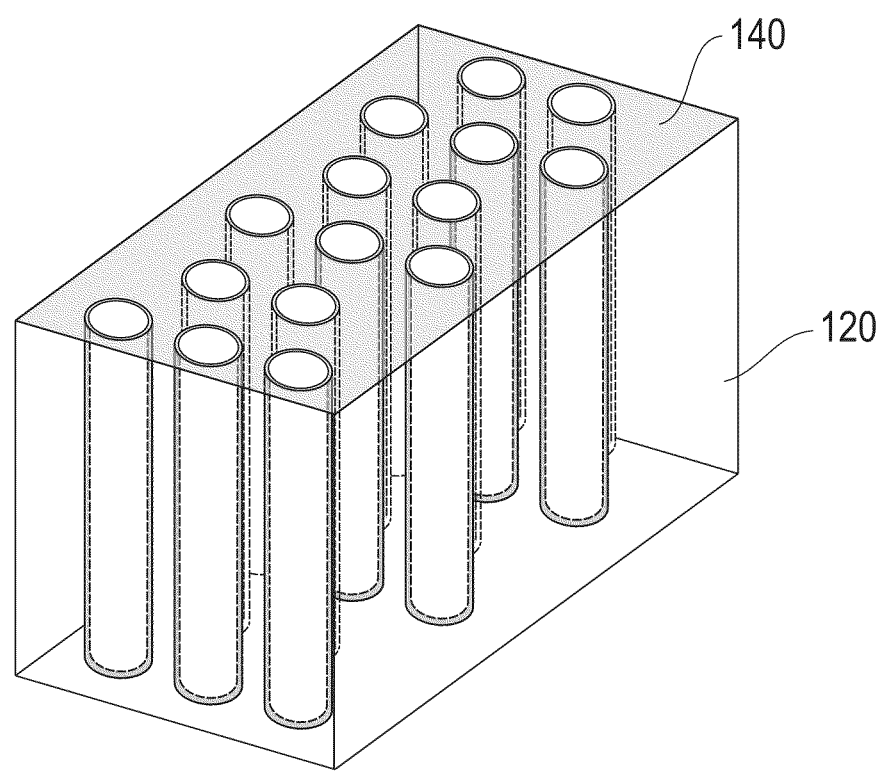
FIG. 2 shows the structure of FIG. 1 but with a semiconductor layer and/or metal oxide deposited over the glassy carbon.

FIG. 1 shows a glassy carbon substrate 120 into which channels 130 have been formed. For clarity, in this and in the other figures herein, only a portion of the substrate 120 is shown, which may extend over several cm$^2$ or more; in principle the number of channels 130 and the size of the substrate 120 may be as large as the corresponding lithographic process will allow. The channels 120 are preferably cylindrical in shape (although non-symmetrical cylindrical shapes such as ellipses are contemplated), or, for example, they may be conically shaped. The channels 120 may advantageously have a critical dimension between 5 and 70 nm, but more preferably between 5 and 50 nm. For example, if the channels 120 are cylindrically shaped, they preferably have a diameter between 5 and 70 nm, and more preferably between 5 and 50 nm. The depth of such channels may advantageously be between 5 and 250 or even 350 nm, with the aspect ratio (diameter/depth) of the channels preferably falling in the range of 1.0-5.0, and more preferably in the range of 1.0-3.0. The wall-to-wall separation between the channels may advantageously be between 2 and 30 nm. In certain embodiments, the channels may be partially or completely filled with a semiconductor and/or metal oxide material, e.g., a conformal layer 140 of semiconductor and/or metal oxide material may be deposited over the channels 130, as shown in FIG. 2. To this end, one of many different deposition processes may be employed, e.g., chemical vapor deposition (CVD), atomic layer deposition, or a solution based process.

Figure 3:
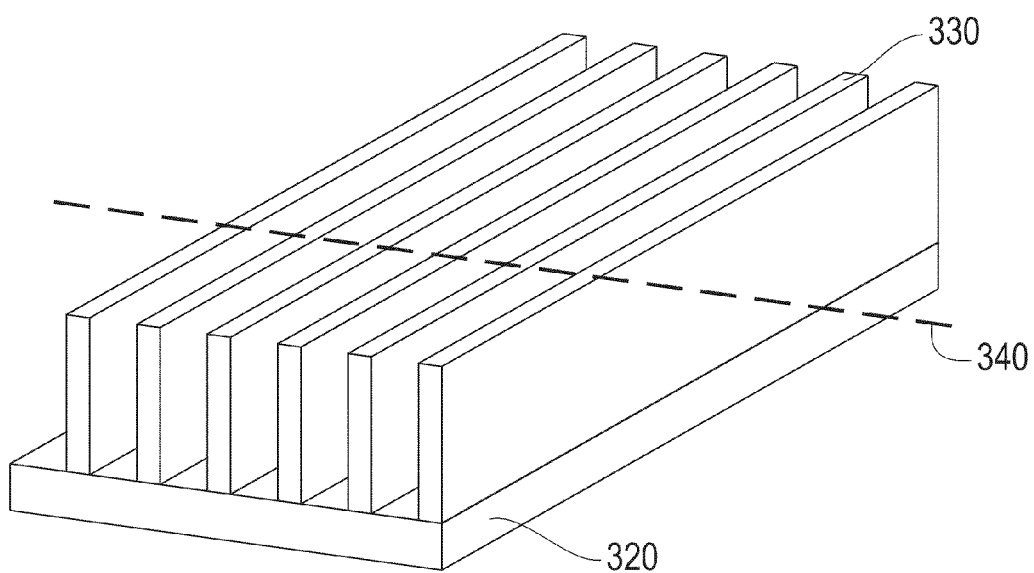
FIG. 3 is a schematic of a glassy carbon structure, in which ridges extend along a surface of the structure.

FIG. 3 shows another embodiment formed from glassy carbon material. In this embodiment, ridges 330 are formed in a glassy carbon substrate 320. Once again, for clarity only a portion of the structure is shown, and the ridges 330 and the substrate 320 may extend as far as the lithographic process used to form the ridges will allow. The ridges 330 preferably have a width (measured at their base) in the range of 5-70 nm, and more preferably 5-50 nm. The height of the ridges 330, on the other hand, is preferably at least equal to their width, and the ridges may be separated from each other by 5-50 nm. The length of the ridges 330, however, is preferably at least 3 times their width, and more preferably at least 5 times their width. For example, the length of the ridges 330 should be at least 15 nm; more preferably, their length is at least 100 nm or even 1000 nm or more. As shown in FIG. 3, the ridges 330 are formed so that they are, at least in a given region, largely parallel to each other and substantially perpendicular to an axis 340, although over larger regions this alignment will not necessarily be evident. As measured along this axis 340, the ridges 330 preferably have a linear density of 10$^5$/cm-10$^6$/cm. A layer 350 (e.g., a conformal layer) of semiconductor material and/or metal oxide material may be deposited over the ridges 330, so that they are partially covered (e.g., just the peaks of the ridges may be covered) or they may be completely covered, as shown in the conformal layer example of FIG. 4.

Applications

Figure 4:
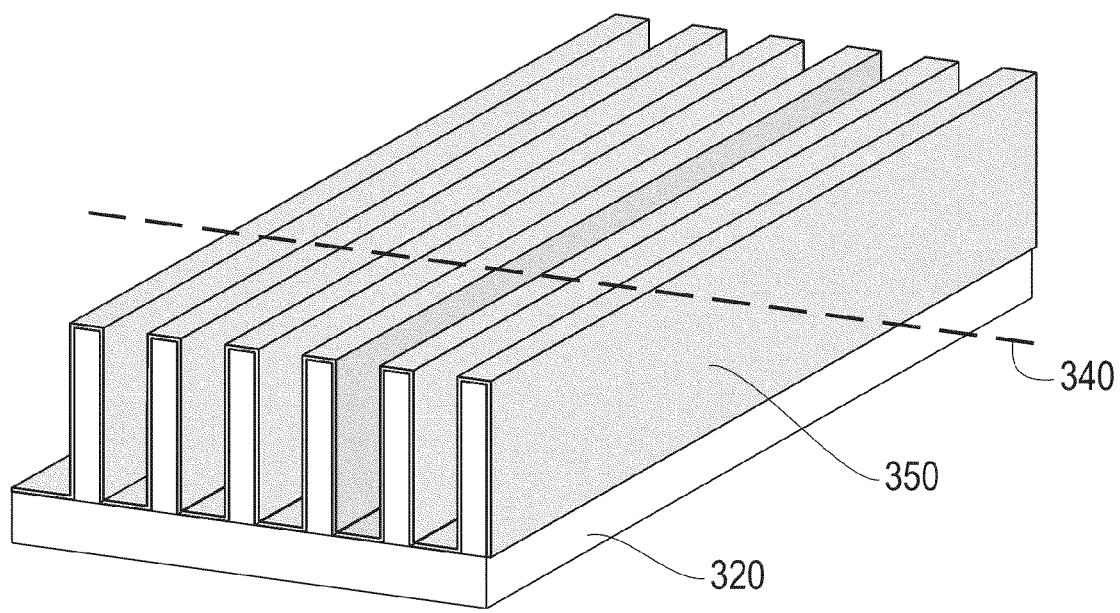
FIG. 4 shows the structure of FIG. 3 but with a semiconductor and/or metal oxide layer deposited over the glassy carbon.
Figure 5:
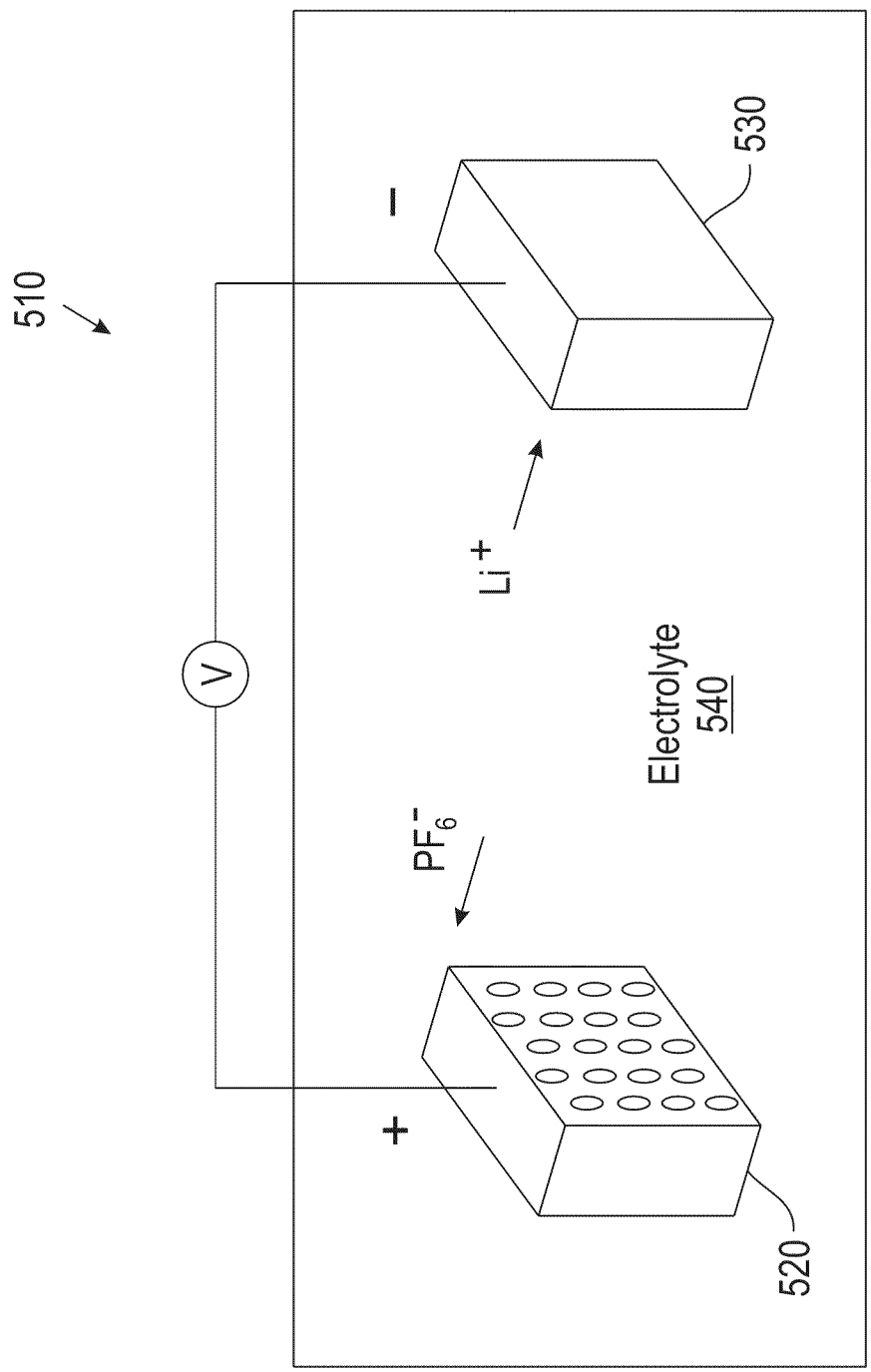
FIG. 5 shows how glassy carbon structures disclosed herein can be incorporated into a battery.

The glassy carbon-based structures shown and described in FIGS. 1-4 can be used in a variety of applications that employ their high surface area to advantage. FIG. 5, for example, shows a battery 510 in which glassy-carbon based nanostructures (such as those shown in FIGS. 1 and/or 3) function as respective electrodes 520, 530 separated by an electrolyte 540. The electrolyte 540 may include a lithium salt (e.g., LiPF$_6$) in an aprotic organic solvent (such as propylene carbonate or ethylene carbonate). Alternatively, one (or both) of the electrodes of the battery 510 may include a semiconductor layer and/or metal oxide layer, as shown in FIGS. 2 and 4. For example, this semiconductor layer and/or metal oxide layer may include MnO$_2$, a Si-based material, Al$_2$O$_3$, vanadium oxide, lithium oxide, cobalt oxide, and/or ruthenium oxide.

Figure 6:
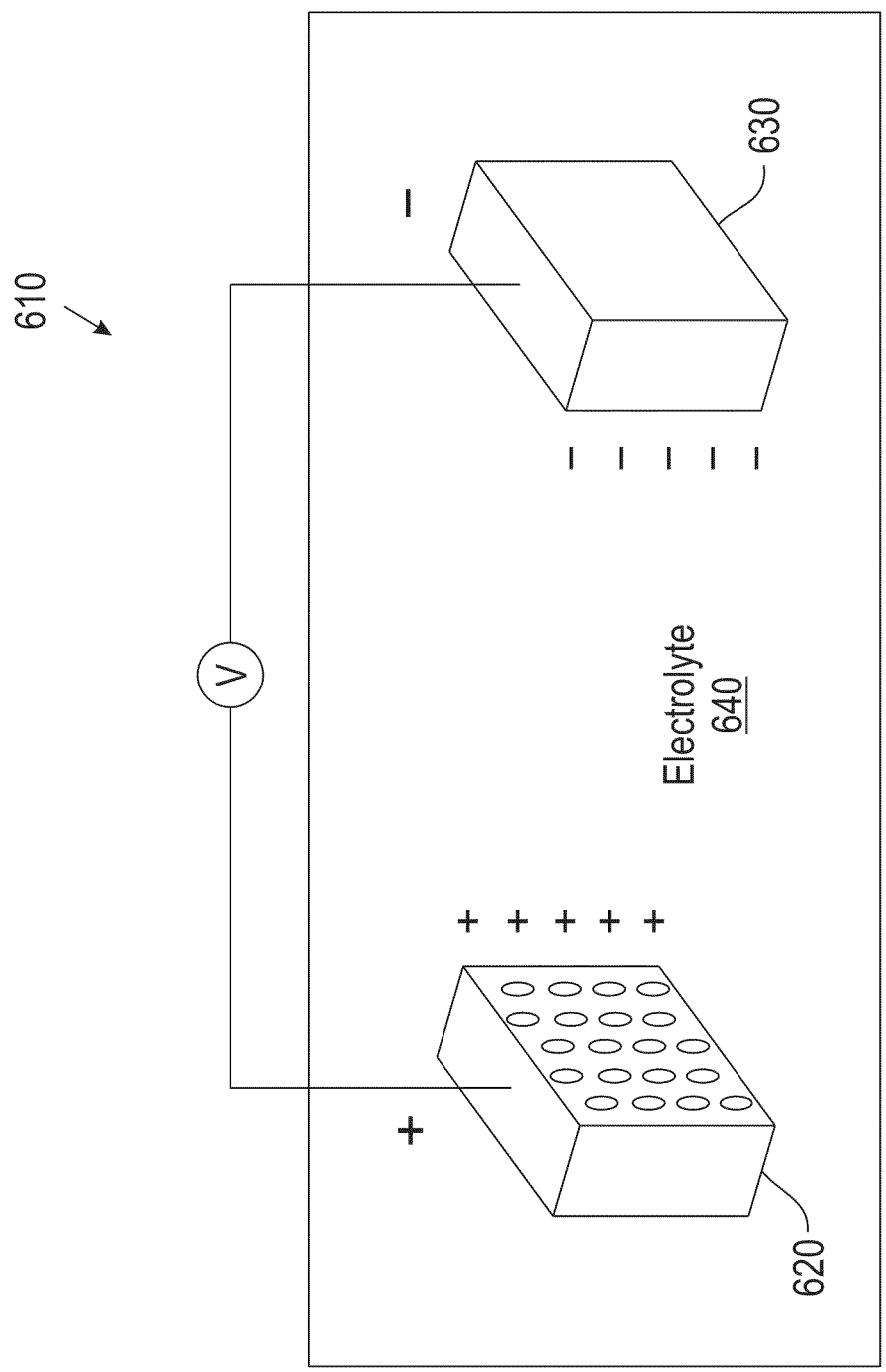
FIG. 6 shows how glassy carbon structures disclosed herein can be incorporated into an electrochemical capacitor.

FIG. 6 shows an electrochemical capacitor device 610 that is analogous in certain respects to the device shown in FIG. 5. Two electrodes 620, 630 made of glassy carbon nanostructures (such as those shown in FIGS. 1 and/or 3) are separated by an electrolyte 640. If the electrolyte 640 is chosen properly, the device 610 functions as an electrochemical capacitor (e.g., H$^+$ and SO4$^-$ may be used, or alternatively, K$^+$ and OH$^-$).

Figure 7:
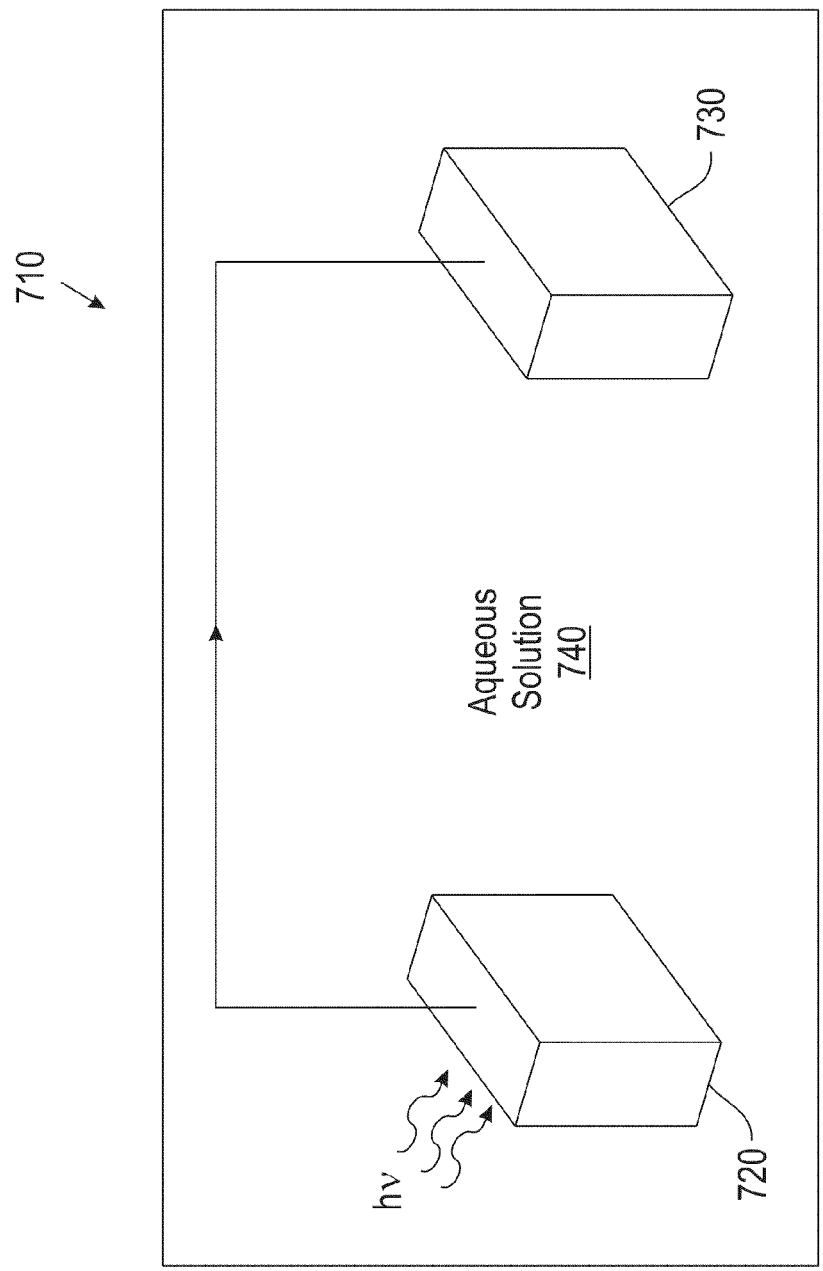
FIG. 7 shows how glassy carbon structures disclosed herein can be incorporated into a photocatalytic device.

FIG. 7 shows a photocatalytic device 710. A glassy carbon nanostructure coated with a semiconductor layer (e.g., see FIGS. 2 and 4) functions as one electrode 720, which is separated from a metal electrode 730 (e.g., made of platinum) by an aqueous solution 740. When photons of the right wavelength are directed towards the electrode 720, electron hole pairs are formed, leading to the formation of H$_2$ and O$_2$ as H₂O is dissociated. Embodiments are contemplated in which a dye (e.g., an organic dye) has been applied to the electrode 720. This dye would be selected such that its absorbance spectrum matches the spectral distribution of the input photons, with the dye in turn reemitting photons at wavelengths favorable for producing electron-hole pairs in the semiconductor layer.

Methods of Formation

1. Overview

Block copolymers (BCPs) are employed to form the carbon nanostructures disclosed herein. Additional details regarding these methods are described in the next section. Briefly, the blocks of such copolymers phase separate into microdomains (also known as "microphase-separated domains" or "domains") to reduce the total free energy, and in the process, nanoscale features of dissimilar chemical composition are formed. Certain ones of these nanoscale features are then transferred via an etch process into an underlying substrate of glassy carbon. However, since the microdomains in a self-assembled block copolymer thin film are typically not spatially registered or aligned in the absence of guidance from the substrate, a surface energy control layer may be optionally used if there is a desire to control the orientation of the block copolymer microdomains. The surface energy control layer may include, for example, an organosilicate, such as polymethyl glutarimide (PMGI).

Figure 8:
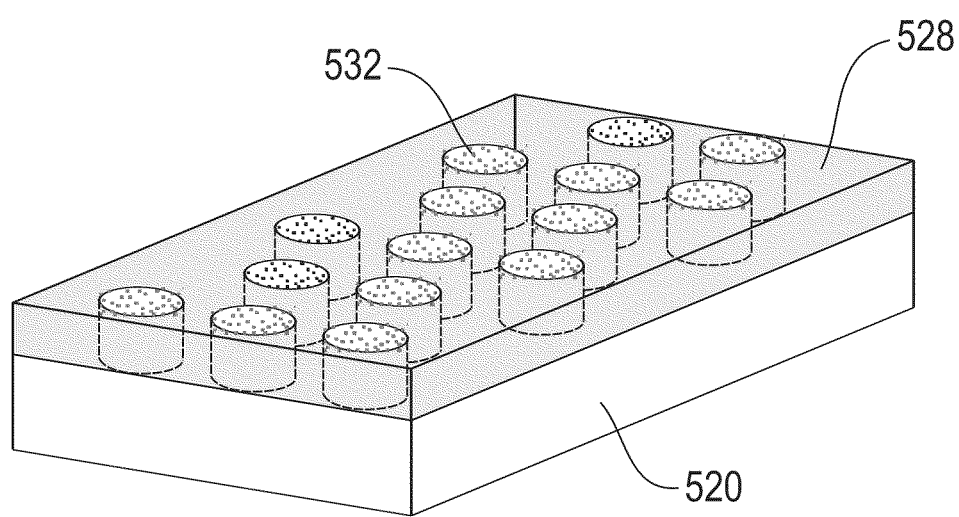
FIG. 8 and FIG. 9, which includes FIGS. 9A, 9B, and 9C, schematically illustrate a process for forming a glassy carbon structure having channels therein, such as the structure shown in FIG. 1.
Figure 9:
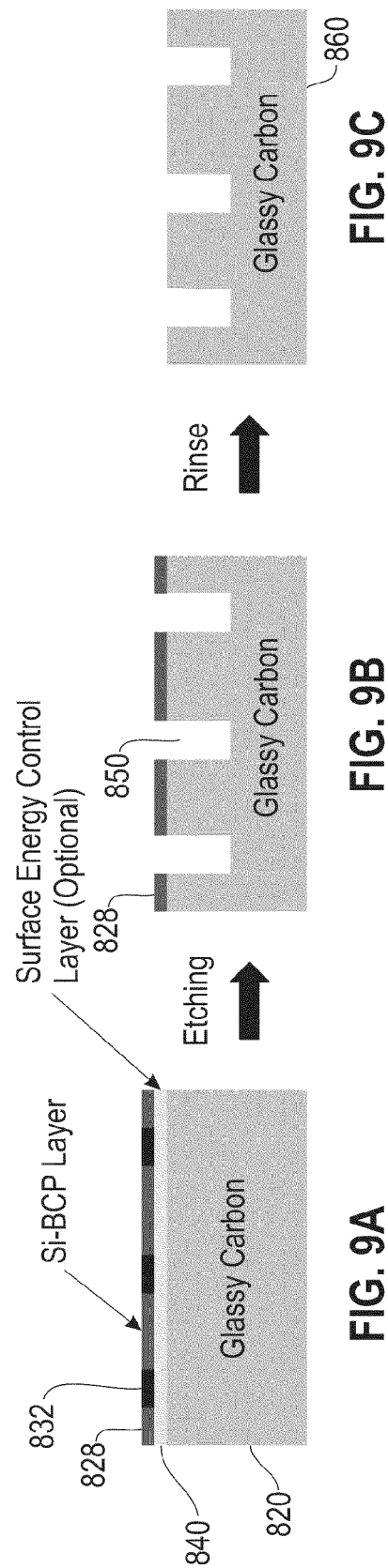

As discussed now in more detail with respect to FIG. 8 and subsequent figures, a solution containing a block copolymer is applied on a substrate 820 of glassy carbon. (For the sake of clarity, only a portion of the substrate is shown.) The block copolymer (a block copolymer containing an organosilicate hybrid may also be used) may be spin-coated, for example, onto the surface of the glassy carbon substrate 820. Microphase-separated domains 828 and 832 are then formed, e.g., as a result of an annealing process. FIG. 9A shows a cross sectional view of the substrate and the phase-separated block copolymer, as well as an optional surface energy control layer 840, which may be used to pre-position the phase separated domains. As indicated in FIG. 9B, an etch process (e.g., an oxygen etch process) is used to remove the discrete, segregated polymer domains 832 and to form a series of holes or channels 850 in the substrate 820. Note that the pitch of the pattern realized in the substrate 820 corresponds to that of the pitch in the lithographic pre-pattern. The domains 828 and any residue from the block copolymer are then removed (e.g., by rinsing with hydrofluoric acid), thereby leaving the desired nanostructure 860, which is analogous to the structure shown in FIG. 1.

A semiconductor material and/or metal oxide material can be subsequently deposited on top of the nanoporous carbon surface. If a wide band gap metal oxide like titania is desired, it may be deposited by electroplating or by depositing a titania precursor (e.g., by spin coating, dip coating, or drop casting a chelated sol-gel precursor). If utilizing visible-light energy is desired, the band gap of titania can be narrowed by blending the titania with other semiconductor nanocrystals, such as CdTe.

Figure 10:
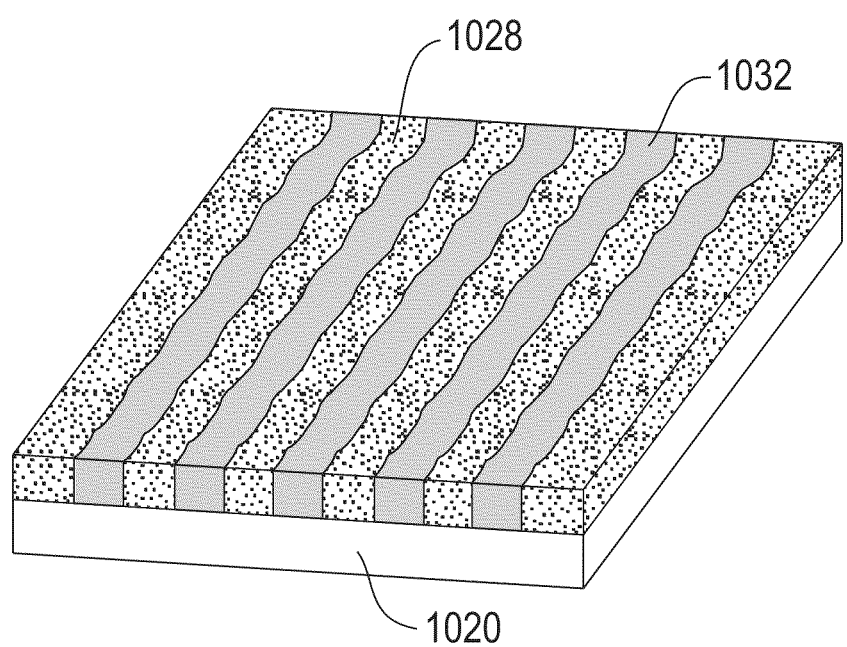
FIG. 10 schematically illustrates a process for forming a glassy carbon structure having ridges therein, such as the structure shown in FIG. 3.

As indicated by FIG. 10, lamellar forming block copolymers can also be used. After a suitable block copolymer-containing solution is cast over a glassy carbon substrate 1020, self-assembly occurs leading to the formation of domains 1028, 1032 that are aligned perpendicularly to the surface of the glassy carbon substrate. These perpendicularly oriented lamellae can be used to provide nanoscale line patterns in the substrate. A surface energy control layer (not shown) may be used to control the position of the domains 1028, 1032. In analogy with FIG. 9, one of the domains can be selectively removed through an etching process, so that further etching into the substrate 1020 results in a series of ridges in the substrate, like the embodiment shown in FIG. 3.

As discussed above in connection with FIGS. 5-7, the carbon nanostructures and the semiconductor-carbon composites (and/or metal oxide carbon composites) disclosed herein can be used as electrodes for electrical energy storage (e.g., in an electrochemical capacitor or Li ion battery) or as photoanodes for photocatalysis and photoelectrochemistry for environmental applications and H₂ generation. Additional details regarding photocatalysis can be found in F. E. Osterloh, Chem. Mater. 20, 35 (2008).

2. Additional Details

A polymer solution containing at least one block copolymer (BCP) is prepared, but additional BCPs, homopolymers, copolymers, surfactants and photoacid generators in the solution may also be employed. The solution is cast on the substrate to form self-assembled domains. Increasing the mobility of the block polymers (e.g., through baking or solvent vapor treatment) may be required for certain polymers, such as PS-b-PMMA (a di-block copolymer of polystyrene (PS) and polymethylmethacrylate (PMMA)). For block copolymers for which the glass transition temperature is lower than room temperature, spontaneous self-assembly may occur. Additional annealing (including thermal annealing, thermal gradient annealing, solvent vapor annealing or some other gradient field) may be optionally employed to remove any defects. Finally, at least one self-assembled polymer domain is selectively removed to generate holes, which can then be transferred into the underlying substrate. For example, both bilayer (resist and transfer layer) and trilayer (resist, hard mask layer, transfer layer) schemes are possible (see, for example, "Introduction to Microlithography", second edition, edited by Larry F. Thompson, C. Grant Willson and Murrae J. Bowden, American Chemical Society, Washington, D.C., 1994). Prior to the pattern development and pattern transfer, the self-assembled polymer may be optionally chemically modified to improve properties necessary for pattern transfer, such as etch resistance or certain mechanical properties.

A copolymer as used herein is a polymer derived from more than one species of monomer. A block copolymer as used herein is a copolymer that comprises more than one species of monomer, wherein the monomers are present in blocks. Each block of the monomer comprises repeating sequences of the monomer. A formula (1) representative of a block copolymer is shown below:

$$-(A)_a-(B)_b-(C)_c-(D)_d- \ldots -(Z)_z-  \qquad (1)$$

wherein A, B, C, D, through Z represent monomer units and the subscripts "a", "b", "c", "d" through "z", represent the number of repeating units of A, B, C, D through Z, respectively. The above-referenced representative formula is not meant to limit the structure of the block copolymer used in the present invention. The aforementioned monomers of the copolymer may be used individually and in combinations thereof in accordance with the methods of the present invention.

A di-block copolymer has blocks of two different polymers. A formula (2) representative of a di-block copolymer is shown below:

$$-(A)_m-(B)_n- \qquad (2)$$

in which the subscripts "m" and "n" represent the number of repeating units of A and B, respectively. The notation for a di-block copolymer may be abbreviated as A-b-B, where A represents the polymer of the first block, B represents the polymer of the second block, and -b- denotes that it is a di-block copolymer of blocks of A and B. For example, PS-b-PMMA represents a di-block copolymer of polystyrene (PS) and polymethylmethacrylate (PMMA). In addition to linear block copolymers, block copolymers with other architecture also can be used for directed self-assembly (DSA), e.g., star copolymers, branched copolymers, hyperbranched copolymers, and grafted copolymers.

The blocks can in general be any appropriate microdomain-forming block to which another, dissimilar block can be attached. Blocks can be derived from different polymerizable monomers, where the blocks might include but are not limited to: polyolefins including polydienes, polyethers including poly(alkylene oxides) (such as poly(ethylene oxide), poly(propylene oxide), poly(butylene oxide), or random or block copolymers of these), poly((meth)acrylates), polystyrenes, polyesters, polyorganosiloxanes, polyorganogermanes, and the like.

The blocks of the block copolymer might comprise as monomers $C_{2-30}$ olefinic monomers, (meth)acrylate monomers derived from $C_{1-30}$ alcohols, inorganic-containing monomers including those based on Fe, Si, Ge, Sn, Al, Ti, or a combination comprising at least one of the foregoing monomers. Monomers for use in the blocks might include, as the $C_{2-30}$ olefinic monomers, ethylene, propylene, 1-butene, 1,3-butadiene, isoprene, vinyl acetate, dihydropyran, norbornene, maleic anhydride, styrene, 4-hydroxy styrene, 4-acetoxy styrene, 4-methylstyrene, or α-methylstyrene. The monomers might include, as (meth)acrylate monomers, methyl(meth) acrylate, ethyl(meth)acrylate, n-propyl(meth)acrylate, isopropyl(meth)acrylate, n-butyl(meth)acrylate, isobutyl(meth) acrylate, n-pentyl(meth)acrylate, isopentyl(meth)acrylate, neopentyl(meth)acrylate, n-hexyl(meth)acrylate, cyclohexyl (meth)acrylate, isobornyl(meth)acrylate, or hydroxyethyl (meth)acrylate. Combinations of two or more of these monomers might be used. Blocks which are homopolymers might include blocks prepared using styrene (e.g., polystyrene blocks), or (meth)acrylate homopolymeric blocks such as poly(methylmethacrylate). Random blocks might include, for example, blocks of styrene and methyl methacrylate (e.g., poly(styrene-co-methyl methacrylate)), randomly copolymerized. An alternating copolymer block might include blocks of styrene and maleic anhydride, which is known to form a styrene-maleic anhydride diad repeating structure due to the inability of maleic anhydride to homopolymerize under most conditions (e.g., poly(styrene-alt-maleic anhydride)). It will be understood that such blocks are exemplary and should not be considered to be limiting.

Furthermore, block copolymers that might be suitable for use in the present methods include diblock or triblock copolymers such as poly(styrene-b-vinyl pyridine), poly(styrene-b-butadiene), poly(styrene-b-isoprene), poly(styrene-b-methyl methacrylate), poly(styrene-b-alkenyl aromatics), poly(isoprene-b-ethylene oxide), poly(styrene-b-(ethylene-propylene)), poly(ethylene oxide-b-caprolactone), poly(butadiene-b-ethylene oxide), poly(styrene-b-t-butyl(meth)acrylate), poly(methyl methacrylate-b-t-butyl methacrylate), poly(ethylene oxide-b-propylene oxide), poly(styrene-b-tetrahydrofuran), poly(styrene-b-isoprene-b-ethylene oxide), poly(styrene-b-dimethylsiloxane), poly(methyl methacrylate-b-dimethylsiloxane), or a combination comprising at least one of the foregoing block copolymers.

The block copolymer desirably has an overall molecular weight and polydispersity amenable to further processing. For example, the block copolymer might have a weight-averaged molecular weight ($M_w$) of 3,000 to 400,000 g/mol. Similarly, the block copolymer might have a number averaged molecular weight ($M_n$) of 1,000 to 200,000. The block copolymer might also have a polydispersity ($M_w/M_1$) of 1.01 to 6, and is not particularly limited thereto. Molecular weight, both $M_w$ and $M_n$, can be determined by, for example, gel permeation chromatography using a universal calibration method, calibrated to polystyrene standards.

The block copolymer formulation may be applied by spin coating it onto the substrate, e.g., at a spin speed from about 1 rpm to about 10,000 rpm, with or without a post-drying process. Other processes may be used for applying the block copolymer formulation to the substrate, such as dip-coating and spray-coating.

As used herein, "phase-separate" refers to the propensity of the blocks of the block copolymers to form discrete microphase-separated domains, also referred to as "microdomains" and also simply as "domains". The blocks of the same monomer aggregate to form domains, and the spacing and morphology of domains depend on the interactions, volume fractions, and number of different blocks in the block copolymer. Domains of block copolymers can form spontaneously while applying them to a substrate such as during a spin-casting step, or they can form as a result of an annealing step. "Heating" or "baking" is a general process wherein the temperature of the substrate and coated layers thereon is raised above ambient temperature. "Annealing" can include thermal annealing, thermal gradient annealing, solvent vapor annealing, or other annealing methods. Thermal annealing, sometimes referred to as "thermal curing" is used to induce phase separation, and in addition, can be used as a process for reducing or removing defects in the layer of lateral microphase-separated domains. It generally involves heating at elevated temperature above the glass transition temperature of the block copolymers, for a period of time (e.g., several minutes to several days).

Solvents that can be used vary with the solubility requirements of the block copolymer components and the various additives, if any. Exemplary casting solvents for these components and additives include propylene glycol monomethyl ether acetate (PGMEA), ethoxyethyl propionate, anisole, ethyl lactate, 2-heptanone, cyclohexanone, amyl acetate, γ-butyrolactone (GBL), toluene, and the like.

Additives can be selected from the group consisting of: additional polymers (including homopolymers, star polymers and copolymers, hyperbranched polymers, block copolymers, graft copolymers, hyperbranched copolymer, random copolymers, crosslinkable polymers, and inorganic-containing polymers), small molecules, nanoparticles, metal compounds, inorganic-containing molecules, surfactants, photoacid generators, thermal acid generators, base quenchers, hardeners, cross-linkers, chain extenders, and combinations comprising at least one of the foregoing, wherein one or more of the additives co-assemble with the block copolymer to form part of one or more of the self-assembled domains.

Example 1

A thin layer of polydimethylglutarimide (PMGI, MicroChem. Co.) was spun-cast on a clean glassy carbon wafer (Nisshinbo Industries, Inc., thickness of 0.6±0.1 mm, outside diameter of 25.0±0.4 mm, surface roughness Ra ~0.5 nm). A mixture of a PS (polystyrene)-b-PEO (polyethylene oxide) (PS molecular weight 9.5 k/mole-PEO molecular weight 9.5 k/mole, Polymer Source, Inc.) and an OS (organosilicate, LKD spin-on dielectric from JSR Micro) was spun-cast on top of the PMGI. The mixing composition of the mixture was controlled to show spherical microdomains. The mixture (hybrid) shows a two phase structure (i.e., a PS phase and a PEO+OS phase) immediately following spin coating and forms PS spheres in the PEO+OS matrix. The sample was baked at 180° C. for 30 min to gently crosslink the OS. Oxygen plasma was used to remove the PS domains from the hybrid layer and generate channels in the glassy carbon substrate. 5 wt % aqueous hydrofluoric acid (HF) was used to rinse the surface.

Figure 11:
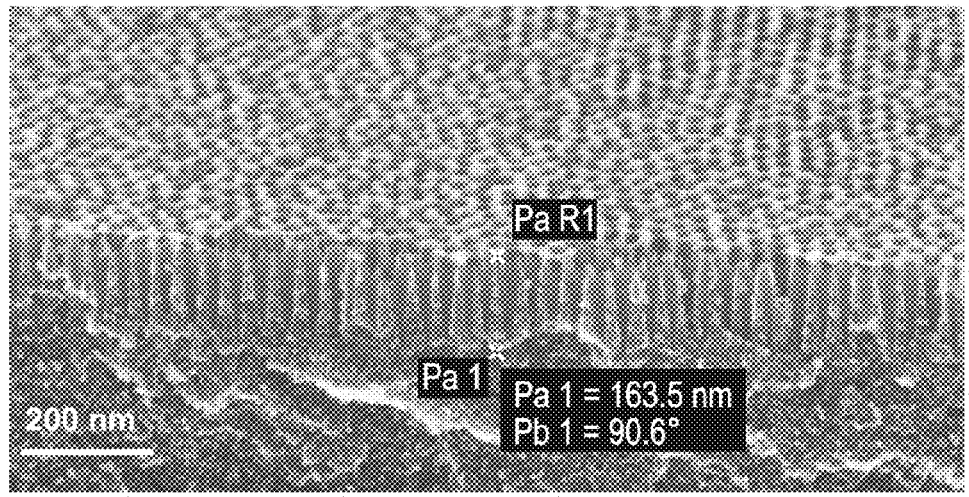
FIG. 11 is a cross-sectional SEM image of a glassy carbon structure having channels therein.
Figure 12:
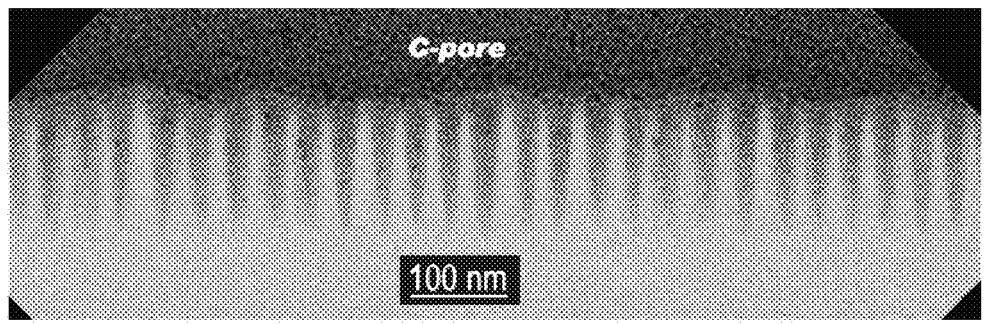
FIG. 12 is a cross-sectional TEM image of the structure shown in FIG. 11.

FIG. 11 shows a cross-sectional scanning electron microscope (SEM) image of the glassy carbon with the channels therein. As shown in the micrograph, approximately 160 nm long channels having a diameter of approximately 20 nm (corresponding to an aspect ratio of ~8) are generated over a large area of the substrate. FIG. 12 shows a cross-sectional transmission electron microscopy (TEM) image of the porous carbon structure shown in FIG. 11. The TEM micrograph shows more detailed pore structures that are slightly conical in shape.

Figure 13:
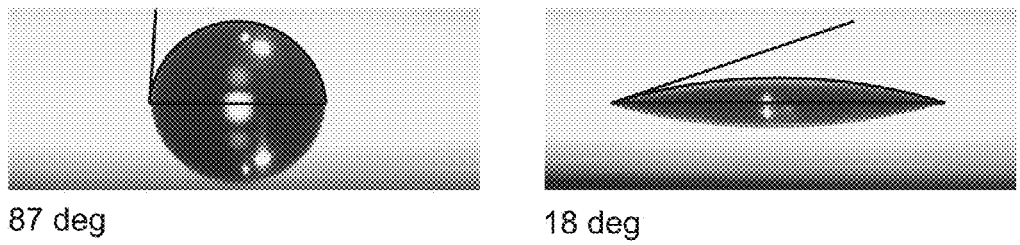
FIG. 13 shows how the water contact angle on a glassy carbon wafer (left) differs from that on a glassy carbon surface into which channels have been introduced (right)

As shown in FIG. 13, the glassy carbon surface has improved wettability as a result of the channels that have been introduced into it. Water contact angles were measured on both the glassy carbon wafer surface (prior to formation of the channels) and the glassy carbon surface with the channels therein. As shown in FIG. 13, the water contact angle drops from 87 degrees to 18 degrees as a result of these channels. It is believed that the oxygen plasma treatment makes the nanoporous carbon surface more hydrophilic, which enhances the wettability of the glassy carbon surface.

Hybridization of glassy carbon with a metal oxide (titania) is demonstrated in Examples 2 and 3.

Example 2

Figure 14:
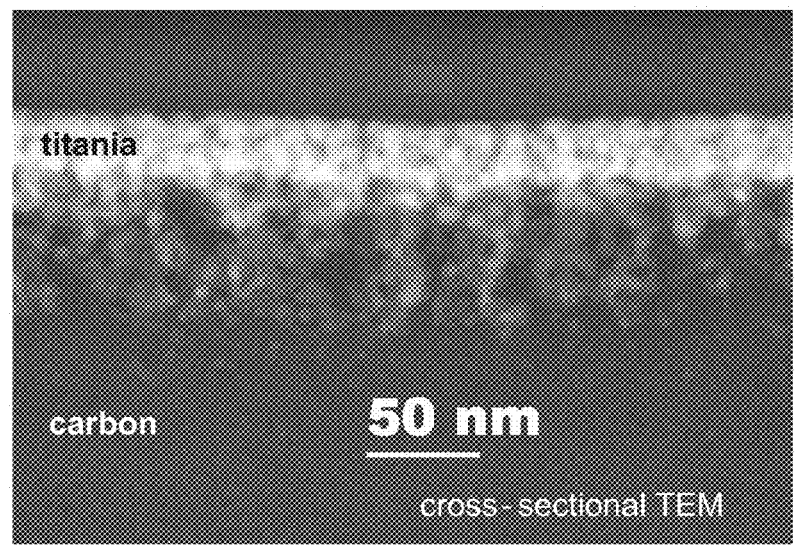
FIG. 14 shows a cross-sectional TEM image of a titania-glassy carbon composite, in which titania has been deposited into and fills the channels of the glassy carbon.

A titania layer was deposited over the glassy carbon structure prepared in Example 1. Specifically, a chelated titania sol-gel precursor was deposited on porous carbon by spin coating. The composite was baked at 450° C. for 2 hrs to generate the anatase phase of titania. FIG. 14 shows a cross-sectional TEM image of the resulting titania-glassy carbon composite. Note that the titania fills the nanoscopic pores of carbon substrate.

Example 3

Figure 15:
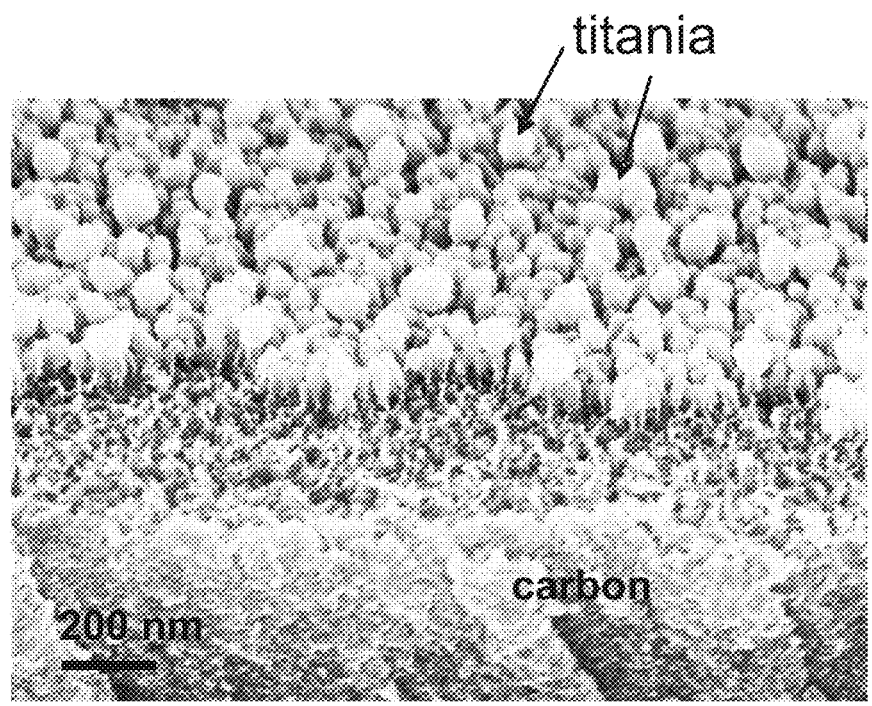
FIG. 15 shows an SEM image of a titania-glassy carbon composite prepared by electroplating titania onto glassy carbon having channels therein.

A titania layer was deposited via electroplating over the glassy carbon structure prepared in Example 1. FIG. 15 shows an SEM image of the resulting titania-glassy carbon composite.

Example 4

The photoactivity of the titania-glassy carbon composite was tested by measuring the photocurrent of a cell containing the composite. The cell was made of the layers shown in FIG. 16A: indium tin oxide/spacer and electrolyte (1M KOH)/titania-glassy carbon. As shown in FIG. 16B, under biased potential, increased photocurrent was measured when the cell was exposed to light from a Xe lamp.

Example 5

Figure 17:
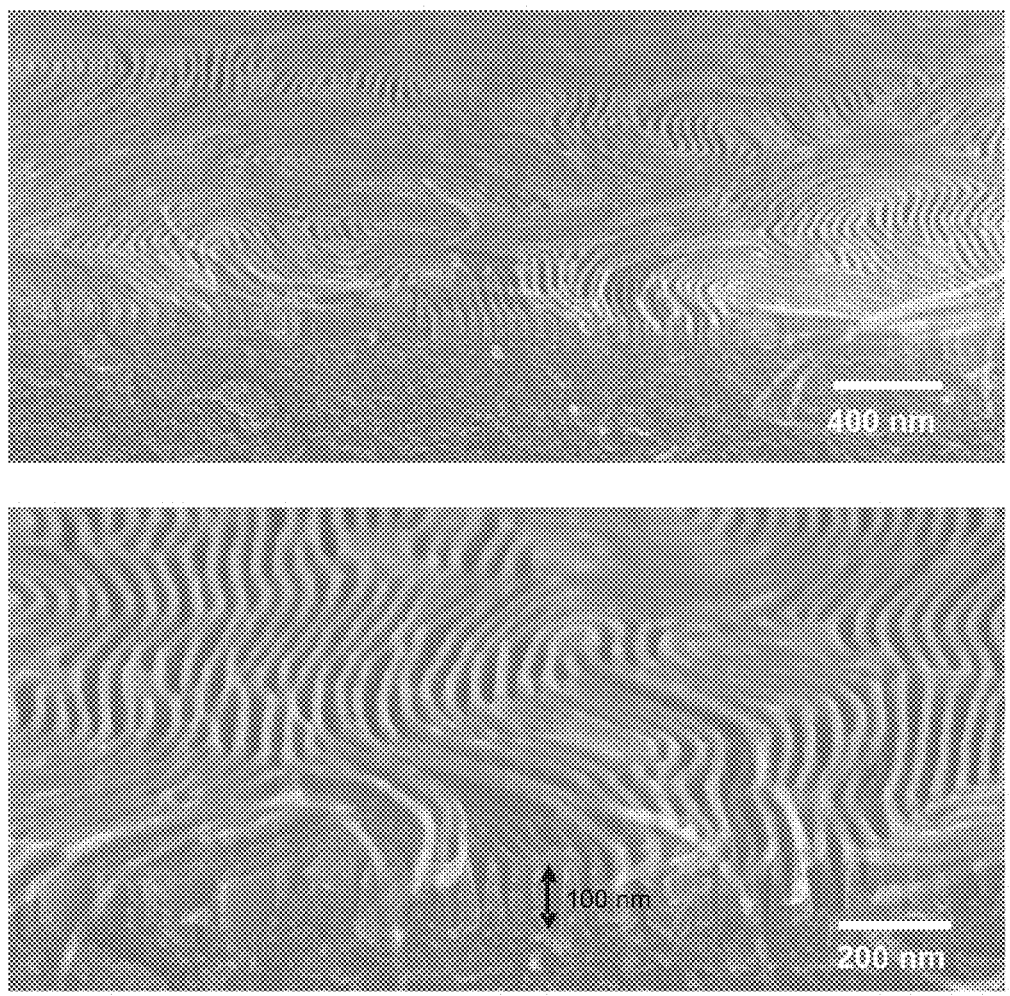
FIG. 17 shows tilted SEM micrographs of glassy carbon structures that include ridges.

A thin layer of polydimethylglutarimide (PMGI, Micro-Chem. Co.) was spun-cast on a clean glassy carbon wafer (Nisshinbo Industries, Inc., thickness of 0.6±0.1 mm, outside diameter of 25.0±0.4 mm, Ra ~0.5 nm). A mixture of a PS-b-PEO (PS 20 k/mole-PEO 14 k/mole, Polymer Source, Inc.) and an OS (organosilicate, LKD spin-on dielectric from JSR Micro) was spun-cast on top of the PMGI. The mixing composition of the mixture was controlled to show lamellar microdomains. The mixture (hybrid) shows a two phase structure (i.e., PS phase and PEO+OS phase) right after spin coating and forms lamellae of PS and PEO+OS. The sample was baked at 180° C. for 30 min to gently crosslink the OS. Oxygen plasma was used to remove the PS domains from the hybrid layer and generate pores in glassy carbon. 5 wt % aqueous HF was used to rinse the surface. FIG. 17 shows tilted SEM micrographs of glassy carbon structures containing ridges that are created by oxygen plasma.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

The invention claimed is:

1. A device, comprising:
a first structure consisting essentially of glassy carbon, the first structure having at least 1000 discrete ridges therein, the ridges extending from a substrate of the first structure, wherein the ridges have:
i) a width between 5 and 70 nanometers;
ii) a height to width ratio of at least 1.0;
iii) a length to width ratio of at least 3.0; and
iv) a linear density of at least $10^5$/cm, as measured along a line segment passing through the ridges.

2. The device of claim 1, further comprising an additional material in contact with the ridges, wherein the additional material is selected from the group consisting of semiconductors (other than carbon) and metal oxides.

3. The device of claim 2, wherein the additional material forms a conformal layer over the first structure.

4. The device of claim 3, wherein the additional material has a thickness of at least 1 nanometer.

5. The device of claim 2, wherein the additional material is selected from the group consisting of titania, manganese oxide, tin oxide, and indium tin oxide.

6. The device of claim 2, further comprising:
a second structure; and
an electrical connection between the first structure and the second structure, the electrical connection permitting current to flow between the first structure and the second structure,
wherein the additional material includes a semiconductor, and
wherein if i) an aqueous solution is between the first structure and the second structure and ii) photons impact the first structure, the device functions as a photocatalytic device.

7. The device of claim 1, further comprising:
a second structure functioning as an electrode; and
an electrical connection between the first structure and the second structure, the electrical connection permitting current to flow between the first structure and the second structure.

8. The device of claim 7, further including an electrolyte between the first structure and the second structure, wherein the device functions as a battery.

9. The device of claim 8, wherein a metal oxide is in contact with the ridges.

10. The device of claim 7, further including an electrolyte between the first structure and the second structure, the device functioning as an electrochemical capacitor.

11. The device of claim 1, further comprising:
a second structure consisting essentially of glassy carbon; and
an electrical connection between the first structure and the second structure, the electrical connection permitting current to flow between the first structure and the second structure.

12. A method of making the device of claim 1, comprising:
applying a block copolymer-containing solution over a layer consisting essentially of glassy carbon, and allowing the block copolymer to self-assemble into at least two domains;
forming an etch mask out of the block copolymer by selectively removing one of the domains;
etching away portions of the layer to form the ridges, by using the etch mask to mask portions of the layer; and
removing the etch mask, thereby leaving the glassy carbon structure.

13. The method of claim 12, further comprising depositing an additional material over the glassy carbon structure.

* * * * *